Apr. 3, 1923.  1,450,424.
C. S. BEEBE.
SLED.
FILED JULY 26, 1921.
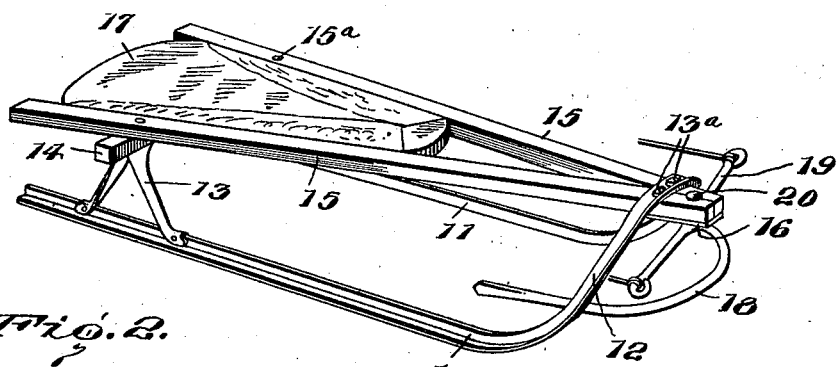
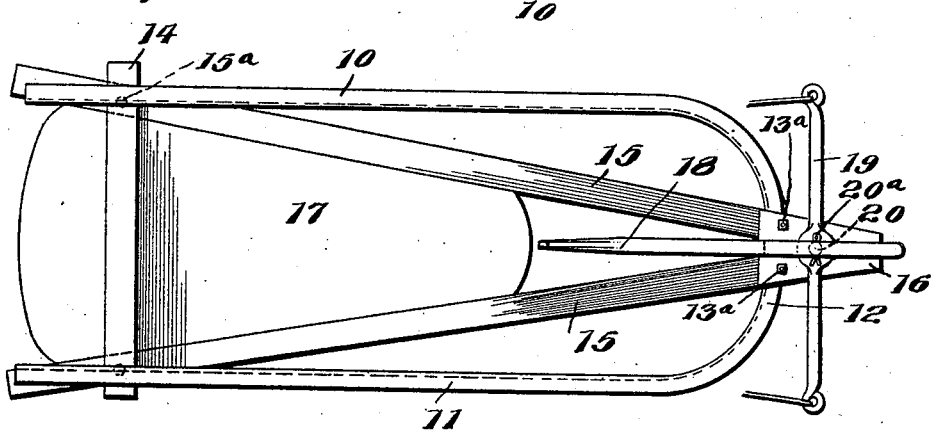
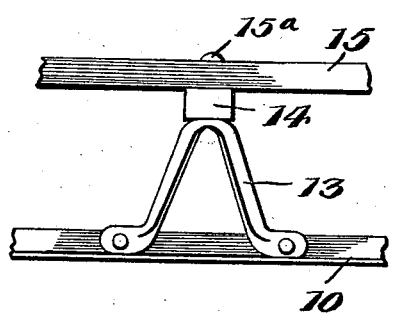
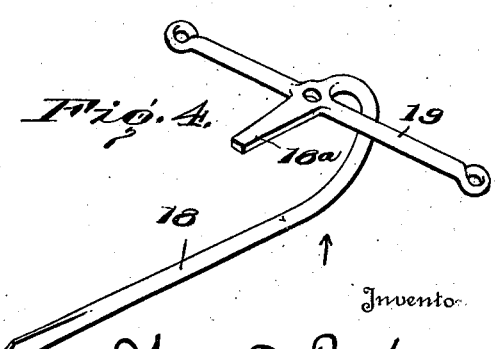
Inventor
Chas S. Beebe
By Hubert E Peck
Attorney

Patented Apr. 3, 1923.

1,450,424

UNITED STATES PATENT OFFICE.

CHARLES S. BEEBE, OF TOMAHAWK, WISCONSIN.

SLED.

Application filed July 26, 1921. Serial No. 487,657.

*To all whom it may concern:*

Be it known that I, CHARLES S. BEEBE, a citizen of the United States of America, and a resident of Tomahawk, county of Lincoln, State of Wisconsin, have invented certain new and useful Improvements in and Relating to Sleds, of which the following is a specification.

This invention relates to certain improvements in sleds, and the nature and objects of the invention will be readily understood by those skilled in the art in the light of the following explanation and detailed description of the accompanying drawings illustrating what I at present believe to be the preferred embodiments or mechanical expressions of my invention from among other forms, arrangements, combinations and constructions within the spirit and scope thereof.

The present invention has particular reference to the so-called "coasting" types of sled, although it is to be understood that the invention and the various features included therein are equally applicable to various other types of sled, as will be clearly seen and appreciated by those familiar with this art.

One of the main objects of this invention is to generally improve the "coasting" types of sled by materially simplifying the construction and arrangements thereof with a resulting increase in the efficiency, strength, comfort and attractiveness of such sleds.

The invention further includes among other objects the elimination of the conventional forward bracing and supports for the deck of a sled by the provision of a construction in which the runners are formed of a single length of material and provide a support at the nose or forward end of the sled for the deck thereof, and also provide the necessary bracing to obtain the desired rigidity and strength at the forward end of the sled.

Another object of the invention is to provide a "coasting" sled with the runners thereof formed from a single length of material so constructed and arranged as to converge upwardly at the nose or forward end of the sled where they provide supports for the feet of the rider when seated in normal position on the sled, without causing the rider discomfort due to cramping or the assumption of an abnormal position of the legs and feet.

Another object of the invention is to overcome the discomforts of the conventional types of sled by providing a construction and arrangement of sled runners formed of a single length of material in which the runners converge upwardly at the nose or forward end of the sled and to provide a deck converging and decreasing in width forwardly to and supported on the forward upwardly converged ends of the runners, so as to permit the legs of the rider seated in normal position on the sled to comfortably and naturally straddle the sled with the rider's feet supported on the runners, due to the smaller width of the deck at the forward portion of the sled.

A further object of the invention is to provide improved guiding and steering means for sleds which is positive and efficient in operation.

A still further object of the invention is to provide a sled having the runners and deck constructed in accordance with the invention, with improved guiding and steering means detachably mounted at the nose or forward end of the sled, in such a manner that the steering means in no wise interferes with the comfort of the rider or the efficiency of the sled in normal use thereof, and which means is positive and accurate in operation and may be readily detached from the sled without impairing the usefulness of the sled without the steering means.

With these and various other objects in view, the invention consists in certain novel features in constructions and in combinations and arrangements as more fully and particularly set forth and specified hereinafter.

Referring to the accompanying drawings:

Fig. 1 is a perspective view of a sled embodying the features of the present invention.

Fig. 2 is a bottom plan view showing particularly the arrangement and mounting of the steering means of the invention.

Fig. 3 is a side elevation of the rear length of a sled embodying the invention and showing particularly the rear deck braces and manner of securing same to the runners.

Fig. 4 is a detail perspective view of the rudder and rudder bar forming the steering means of the invention.

In the accompanying drawings, I show an embodiment and application of the present invention in the form of a "coasting" sled which includes the various features, combinations and arrangements contemplated by the invention. A length of any suitable or desired material, in the present instance, a length of angle iron of L shape in cross section, is bent, cast or otherwise formed to provide the opposite and substantially parallel runners 10 and 11, and the arched, transverse member 12 integral with and connecting the forward ends of the runners 10 and 11. The arched transverse member 12 is formed in effect, by the opposite runners which are extended at the forward or nose ends and these opposite integral extensions are bent or extended upwardly, inwardly and forwardly to a position midway between and above the runners 10 and 11 thus providing the transverse arched member 12 integral with and bracing the runners 10 and 11 at their forward ends and maintaining the same in proper rigid spaced relation at the nose or forward end of the sled.

A pair of V-supports and braces 13 are rigidly secured by means of bolts, or the like fastenings, at opposite points on the runners 10 and 11, respectively, adjacent the rear ends thereof. A beam 14 is secured on said supports and braces 13 and extends transversely across the runners at a distance thereabove which is determined by the height of the supports 13. A pair of longitudinal beams 15 are mounted on the transverse beam 14 at opposite ends thereof, respectively, and are suitably securely fastened to the transverse beam 14, as by the bolts 15$^a$. These longitudinal beams 15 extend forwardly and are converged to meet at the nose or forward end of the sled where they are secured together in proper relation by means of a plate 16. The converged beams 15 pass under the central portion of the transverse arched member 13 between the forward ends of the runners 10 and 11, at which point they are rigidly fastened thereto by means of bolts or the like 13$^a$, and the converged joined ends of the beams 15 extend a distance forwardly of the arched member 13. The foregoing arrangement is such that the longitudinal beams 15 are supported at the rear of the sled by the transverse beam 14 and at the nose or forward end of the sled by the arched member 13, which member, in effect, extends over and has the converged ends of the beams 15 secured to the under side of the top of the arched member by the bolts 13$^a$.

Suitable decking 17 is secured between and to the longitudinal beams 15 and across and to the transverse beam 14. In the particular example illustrated, the decking 17 extends forwardly a distance between the longitudinal beams 15 and terminates a distance rearwardly of the nose or forward end of the sled.

Thus, from the foregoing, it will be seen that the deck of the sled is formed of the longitudinal converged beams 15 and the decking 17, so that, the shape of the deck is substantially triangular and decreases in width from the rear to the forward or nose end of the sled, for a purpose fully explained hereinafter. Due to the peculiar shape, formation and arrangement of the decking 17 and the longitudinal converged beams 15, the deck of the sled formed thereby, is pointed and decorated to resemble an insect, such for example, as a "fly", the head of the insect being simulated by the jointed, converged ends of the longitudinal beams and the arched member 13, the wings by the longitudinal beams extending along and a distance rearwardly of the decking 17, and the body of the insect by the decking 17 which is rounded at its rear and forward ends. It is readily apparent from Fig. 1 of the drawings, that by the application of the required colors the resemblance to an insect can be plainly indicated.

The invention includes the provision of steering means for sleds which is particularly applicable to a sled constructed in accordance with the invention as hereinbefore described. This steering means comprises a rudder 18 and rudder bar 19 for operating the same detachably mounted on the nose or forward end of the sled for pivotal movement on a substantially vertical axis. A suitable vertically disposed bore is provided through the converged joined ends of the longitudinal deck beams 15 and the plate 16 forward of the member 13. A bolt or pin 20 is mounted in the bore and extends downwardly therethrough and has the rudder 18 and rudder bar 19 pivotally mounted thereon. A cotter pin 20$^a$ is utilized to detachably secure the rudder and rudder bar on the pin 18$^a$. In the particular embodiment illustrated the rudder is formed of a length of material, for example bar or rod iron, and extends downwardly and rearwardly a distance between the runners 10 and 11, and approximately in the same horizontal plane therewith. The upper end 18$^a$ of the rudder 18 is bent rearwardly to an approximately horizontal position and has the rudder bar 19 welded or otherwise suitably fastened transversely thereacross.

The rudder 18 and rudder bar 19, so secured and joined together, are mounted pivotally on the bolt or pin 20 which extends through a bore provided at the point where the rudder and rudder bar are joined, as will be clearly seen and understood by reference to the accompanying drawings. With the rudder 18 and rudder bar 19 mounted on the pin 20, the plate 16 acts as a bearing and wearing surface for the steering means in operation. The ends of the rudder bar 19 extend transversely across the forward end of the sled and are adapted to receive the feet or the hands of the rider to rock the same and thereby swing the rudder 18 on the pin 20 to steer the sled, as will be understood by those familiar with this art. The outer ends of the rudder bar 19 are formed with eyes, or the like 19ª to receive cords by which the rudder can be turned to steer the sled with the rider sitting in upright position thereon. The bolts 13ª which secure the beams 15 to the member 16 extend through and depend below the plate 16, thus providing spaced stops limiting the distance the rudder can be swung in operation, due to the upper length 18ª of the rudder 18 which is positioned between the bolts 13ª. The length 18ª further provides an extended bearing surface for the rudder 18 and with the bolts 13ª prevents the rudder striking the runners 10 and 11.

From the foregoing detailed description and explanation of the illustrated embodiment of the invention it is apparent that the rider can sit in normal, upright position on the sled with his legs comfortably straddling the deck, due to the narrowing width thereof at the forward end, and his feet resting and supported upon the forward curved portion of the runners 10 and 11. In this position the sled is guided by suitable cords held in the rider's hands and secured to the eyes 19ª of the rudder bar. The peculiar construction of the runners 10 and 11 with the integral upwardly converged and arched member 13 provides the necessary support for the deck and braces the same transversely against all the strains and stresses to which the forward end of the sled is subjected in use.

In operation, the rudder 18 extends rearwardly a distance between the sled runners 10 and 11 and in contact with the surface upon which the sled is being used, so that, turning of the rudder bar 19 on the pin 20 causes swinging movement of the rudder 18 which in turn causes a change in direction at the nose or forward end of the sled and the sled to follow the changed course. In order to detach the steering means the cotter pin 20 is removed and the rudder 18 and the rudder bar 19 withdrawn from the pin 20. With the steering means detached, the sled may be used in the same manner as with the steering means mounted thereon and can be steered in any of a number of ways familiar to users of "coasting" sleds. If it is desired to use the sled as a trailer or connected to other sleds it is not necessary to detach the steering means as the rudder 18 is so formed that it will freely trail between the runners without interference, and in fact will serve as an additional runner for the forward end of the sled.

The construction of the sled is such that the bracing and supports are reduced to the minimum without in any way sacrificing the strength and durability of the sled. The reduction of the foregoing elements causes a decrease in the number of fastenings and bolts required and hence the entire cost and time of production is materially decreased.

It is evident that various changes, variations and modifications might be resorted to without departing from the spirit and scope of my invention and hence I do not wish to limit myself to the exact disclosures hereof.

What I claim is:

1. In a sled, runners formed with an integral arched member extending upwardly therefrom with the sides of said member converged inwardly and extending across the forward ends of said runners, a pair of longitudinal side beams extending from the rear of the sled and converging forwardly a distance beyond said arched member, said side beams supported by and secured to said arched member, and steering means detachably mounted on said side beams forwardly of said arched member.

2. A sled comprising a pair of spaced runners, having the forward ends thereof extended upwardly and converging inwardly to provide an arched member extending between and above said runners, longitudinal side beams extending from the rear of the sled and converging forwardly to and extending beyond said arched member, said side beams secured to and braced by said arched member at their forward ends, a rudder consisting of a rod pivotally mounted on the converging ends of said side beams forwardly of said arched member, said rod bent to extend downwardly and a distance rearwardly between said runners and a rudder bar for swinging said rudder laterally to steer the sled.

3. In a sled, in combination, spaced runners having an upwardly extending arched member connecting the forward ends thereof, longitudinal side beams extending from the rear of the sled and converging forwardly to and extending beyond said arched member, and a rudder mounted on said side beams forwardly of said arched member, the said side beams forming a support for said rudder.

4. In a sled, in combination, spaced runners having an upwardly extending arched member connecting the forward lengths thereof and extending transversely therebetween and thereabove, longitudinal side beams extending from the rear of the sled and converging forwardly and extending through and beyond said arched member, the said side beams secured to and supported from said arched member.

5. In a sled, in combination, spaced runners having an upwardly disposed arched member connecting and bracing the forward lengths of said runners and extending therebetween and thereabove, longitudinal side beams extending from the rear of the sled and converging forwardly and extending a distance beyond said arched member, said side beams supported from said arched member and the portion thereof extending forwardly of said arched member provided with a bearing and guiding plate, and a rudder mounted on and supported from said side beams forwardly of said arched member and cooperating with said bearing and guiding plate.

6. In a sled, in combination, spaced runners having an upwardly extending arched member connecting the forward lengths thereof, longitudinal side beams extending from the rear of the sled and converging forwardly to, supported from and braced by said arched member.

CHAS. S. BEEBE.